United States Patent
Hirano et al.

(10) Patent No.: US 8,155,680 B2
(45) Date of Patent: Apr. 10, 2012

(54) SENSING RF ENVIRONMENT TO SYNCHRONIZE NETWORK ELEMENTS

(75) Inventors: Mike Hirano, Redmond, WA (US); M. Sue McMeekin, Snohomish, WA (US)

(73) Assignee: Broadcom Corporation, Irvine, CA (US)

( * ) Notice: Subject to any disclaimer, the term of this patent is extended or adjusted under 35 U.S.C. 154(b) by 961 days.

(21) Appl. No.: 11/645,118

(22) Filed: Dec. 21, 2006

(65) Prior Publication Data

US 2008/0085721 A1 Apr. 10, 2008

Related U.S. Application Data (60) Provisional application No. 60/850,872, filed on Oct. 10, 2006.

(51) Int. Cl.
*H04B 15/00* (2006.01)
(52) U.S. Cl. .......................... 455/502; 370/503; 370/509
(58) Field of Classification Search .................. 455/436, 455/450; 370/503, 509
See application file for complete search history.

(56) References Cited

U.S. PATENT DOCUMENTS

| 6,028,853 | A | 2/2000 | Haartsen et al. |
| 6,647,000 | B1* | 11/2003 | Persson et al. ................ 370/330 |
| 2002/0111163 | A1 | 8/2002 | Hamabe |
| 2002/0196781 | A1* | 12/2002 | Salovuori ...................... 370/352 |
| 2003/0058976 | A1* | 3/2003 | Ohta et al. .................... 375/350 |
| 2004/0152478 | A1* | 8/2004 | Ruohonen et al. ............ 455/502 |
| 2004/0233889 | A1 | 11/2004 | Fujita et al. |
| 2005/0030935 | A1 | 2/2005 | Seisenberger et al. |
| 2005/0130644 | A1* | 6/2005 | Bassompierre et al. ... 455/422.1 |
| 2005/0207334 | A1 | 9/2005 | Hadad |
| 2005/0219000 | A1 | 10/2005 | Wu |
| 2006/0088023 | A1* | 4/2006 | Muller .......................... 370/350 |

* cited by examiner

*Primary Examiner* — Marcos Batista
(74) *Attorney, Agent, or Firm* — Sterne, Kessler, Goldstein & Fox PLLC (57) ABSTRACT

Providing a frequency reference to a mobile telecommunications base station is disclosed. A radio frequency signal that includes a periodic component having a known frequency is received. A frequency reference is derived from the received radio signal, based at least in part on the periodic component. The frequency reference is used to transmit from the base station at an assigned frequency.

18 Claims, 6 Drawing Sheets

FSBBBBCCCC FSCCCCCCC FSCCCCCCC FSCCCCCCC FSCCCCCCC I

F = FCCH  S = SCH  B = BCCH  C = CCCH  I = Idle

SENSING RF ENVIRONMENT TO SYNCHRONIZE NETWORK ELEMENTS

CROSS REFERENCE TO OTHER APPLICATIONS

This application claims priority to U.S. Provisional Patent Application No. 60/850,872 entitled Method of RF Monitoring, filed Oct. 10, 2006, which is incorporated herein by reference for all purposes.

BACKGROUND OF THE INVENTION

In a mobile telecommunication network, such as a GSM or other mobile network, it is typically required for proper functioning and/or by standard that a base station, such as a GSM or other base transceiver station, broadcast at an assigned frequency within a prescribed tolerance. To generate an assigned frequency, such as a beacon channel or frequency, within the prescribed tolerance, an accurate local oscillator is required. Oscillators that maintain their accuracy for prolonged periods and/or in a range of operating conditions, such as temperature, are expensive. Less expensive oscillators (e.g., quartz or other crystal oscillators) can be used, but these require an external frequency reference to discipline them. There is a need for an effective and relatively inexpensive way to provide such a frequency reference to a mobile network element, such as a small scale base transceiver station, that is not connected by a direct, wired connection to another node configured to provide such a reference.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a beacon or other signal transmitted by a macro-cell base station (e.g., BTS) as a frequency reference for a potentially movable mobile network element, such as a small scale base station, is disclosed. In some embodiments, a small scale base station or other network equipment (as opposed to a cellular telephone or other mobile station) is equipped with a radio frequency (RF) sensor configured to receive a beacon or other signal transmitted by a macro-cell base station (e.g., a BTS). The base station (or other equipment) derives a frequency reference from the received beacon (or other) signal, and uses the frequency reference to transmit at an assigned frequency with the required accuracy.

Figure 1:
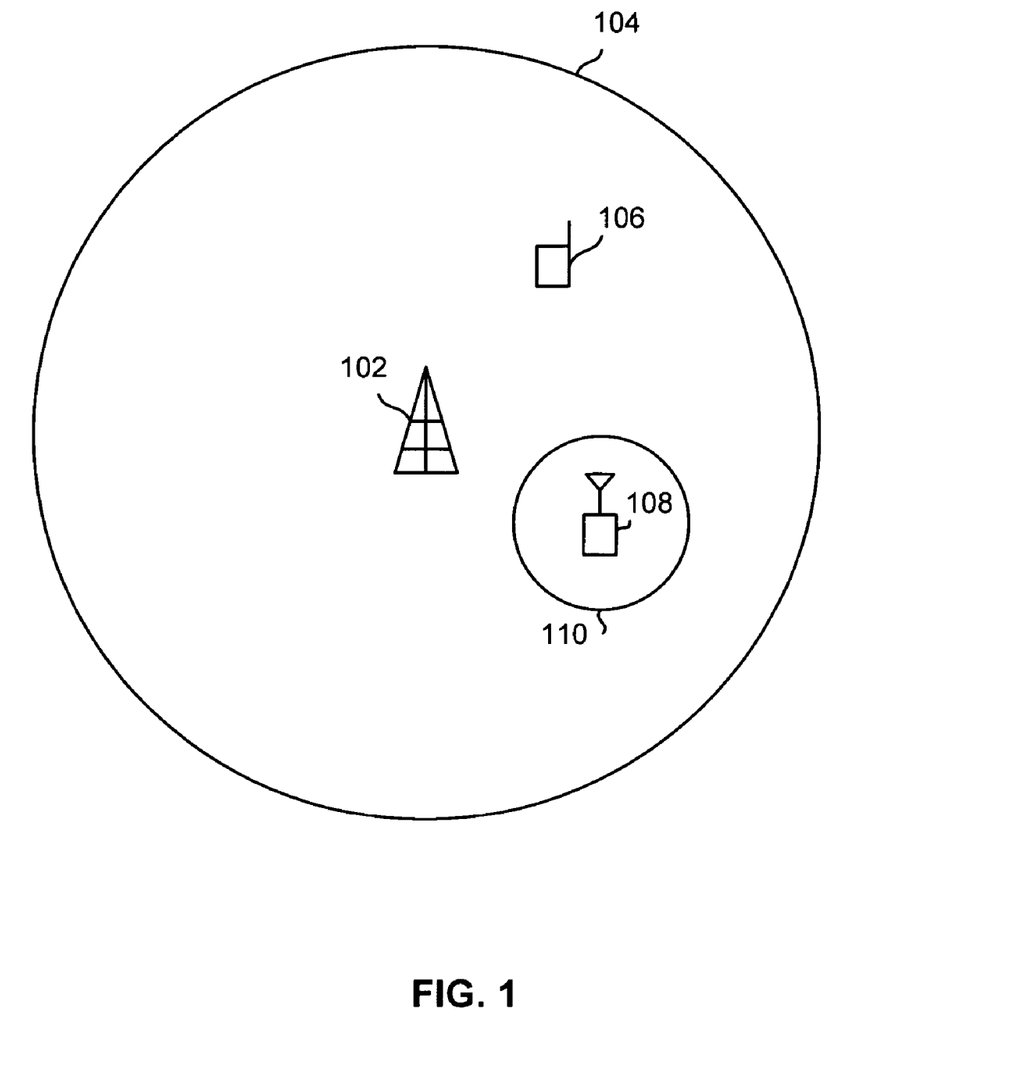
FIG. 1 is a block diagram illustrating an embodiment of a cellular network in which a small, potentially movable base transceiver station has been deployed.

FIG. 1 is a block diagram illustrating an embodiment of a cellular network in which a small, potentially movable base transceiver station has been deployed. In the example shown, a potentially movable micro-, pico-, or femto-BTS 108 (sometimes referred to herein as a "small scale base station") having an associated coverage area 110 has been deployed in the cellular network of FIG. 1, in a location within a coverage area 104 of a macro-cell BTS 102. A mobile station (MS) 106, such as a cellular phone, is shown to be in a location within macro-cell coverage area 104 of macro-cell BTS 102 and accesses a core mobile network (not shown) via BTS 102. In some embodiments, when within coverage area 110 MS 106 would have access to the core mobile network, if authorized, via small scale base station 108.

Figure 2:
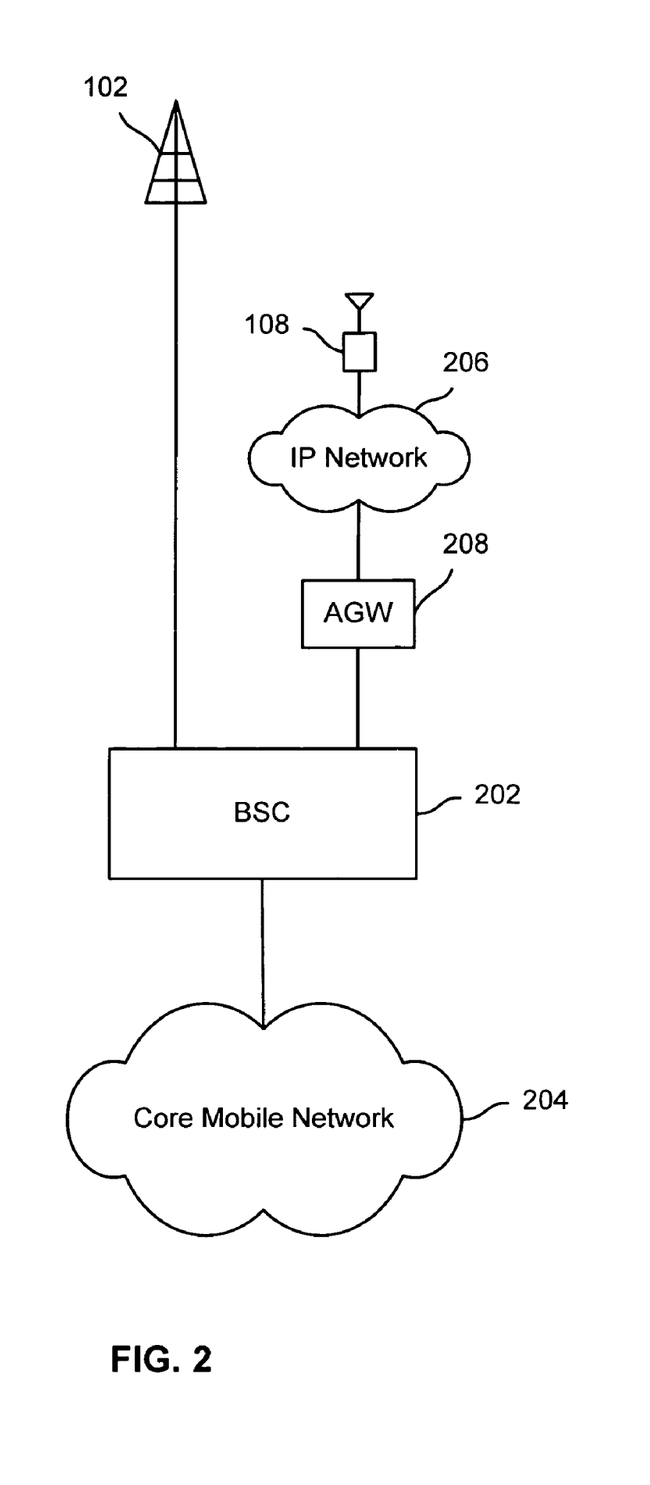
FIG. 2 is a block diagram illustrating an embodiment of a micro-, pico-, and/or femto-BTS or other small and/or potential movable base transceiver station with IP network backhaul.

FIG. 2 is a block diagram illustrating an embodiment of a micro-, pico-, and/or femto-BTS or other small and/or potential movable base transceiver station with IP network backhaul. Macro-cells such as macro-BTS 102 typically communicate with the core mobile network 204 via a dedicated land line (e.g., T–1/E–1) to a BSC such as BSC 202. Typically, a frequency reference is provided to a macro-cell BTS via the land line by which it is connected to the BSC. In the example shown in FIG. 2, small scale base station 108 of FIG. 1 is shown as being connected to BSC 202 via an IP network 206 and an aggregation gateway (AGW) 208. In some embodiments, AGW 208 is configured to support one or more small scale base stations such as base station 108, aggregating their traffic and translating traffic sent via the IP network 206 using a suitable IP network protocol, e.g., the real-time transport protocol (RTP) for voice traffic, to the Abis (for GSM) or similar interface to the BSC (or equivalent node in a non-GSM network), and vice versa. As high-speed Internet access for homes and small businesses becomes more and more ubiquitous, it has become and will continue to become more and more possible to deploy small scale base stations in homes and businesses, and use IP backhaul to provide connectivity to the core mobile network, avoiding the cost and waste of bandwidth that would attend if each such base station required a dedicated T-1/E-1 or other high capacity connection. Since the small scale base station is connected to the BSC by an IP network, instead of a land line, no direct land line connection is available to be used to provide a frequency reference from the BSC to the small scale base station.

Due to the small scale and coverage area of base station 108, it may not be commercially feasible or otherwise desirable to include a high precision oscillator in or with base station 108. However, to ensure small scale base station 108 transmits at the correct operating frequency, which is required to avoid interference with elements of the macro-cellular network, such as macro-cell BTS 102, and to ensure proper functioning when communicating with mobile stations such as MS 106, base station 108 requires a sufficiently accurate frequency reference. Configuring base station 108 to receive and derive a frequency reference from a beacon (or other) signal broadcast by a macro-cell, such as macro-cell BTS 102, is disclosed.

In normal operations, a GSM handset (or Mobile Station—MS) acquires frequency and burst timing synchronization with a macro-cell by finding and processing synchronization bursts transmitted by the macro-cell's beacon frequency. In a similar fashion, in various embodiments an RF sensor included in and/or deployed with a small scale base station is used to derive a frequency reference from the surrounding macro-network. In some embodiments, a frequency reference is derived from the surrounding macro-network if at least one macro-cell beacon channel at a sufficient power level is detected; otherwise, an alternative (e.g., backup) frequency reference, such as one provide to the small scale base station via an IP network connection or other communication interface, e.g., by AGW 208 via IP network 206 in the example shown in FIG. 2, is used.

In some embodiments, an RF sensor is housed within the small scale base station, potentially within a building, so some degree of attenuation of macro-cell signals may be caused by building blockage or other obstacles. If the attenuation is not too severe, the RF sensor (e.g., hardware and signal processing software) may be able to retrieve a macro-network signal, beyond the extent expected from a handset operating under "normal" signal-to-thermal-noise ratio conditions. Signal detection and estimation processing—in the general form of prolonged signal averaging or aggregation—is used in some embodiments to enhance the received signal-to-thermal-noise ratio. In other words, extra signal processing and extra processing time are used in some embodiments to mitigate building attenuation.

Figure 3A:
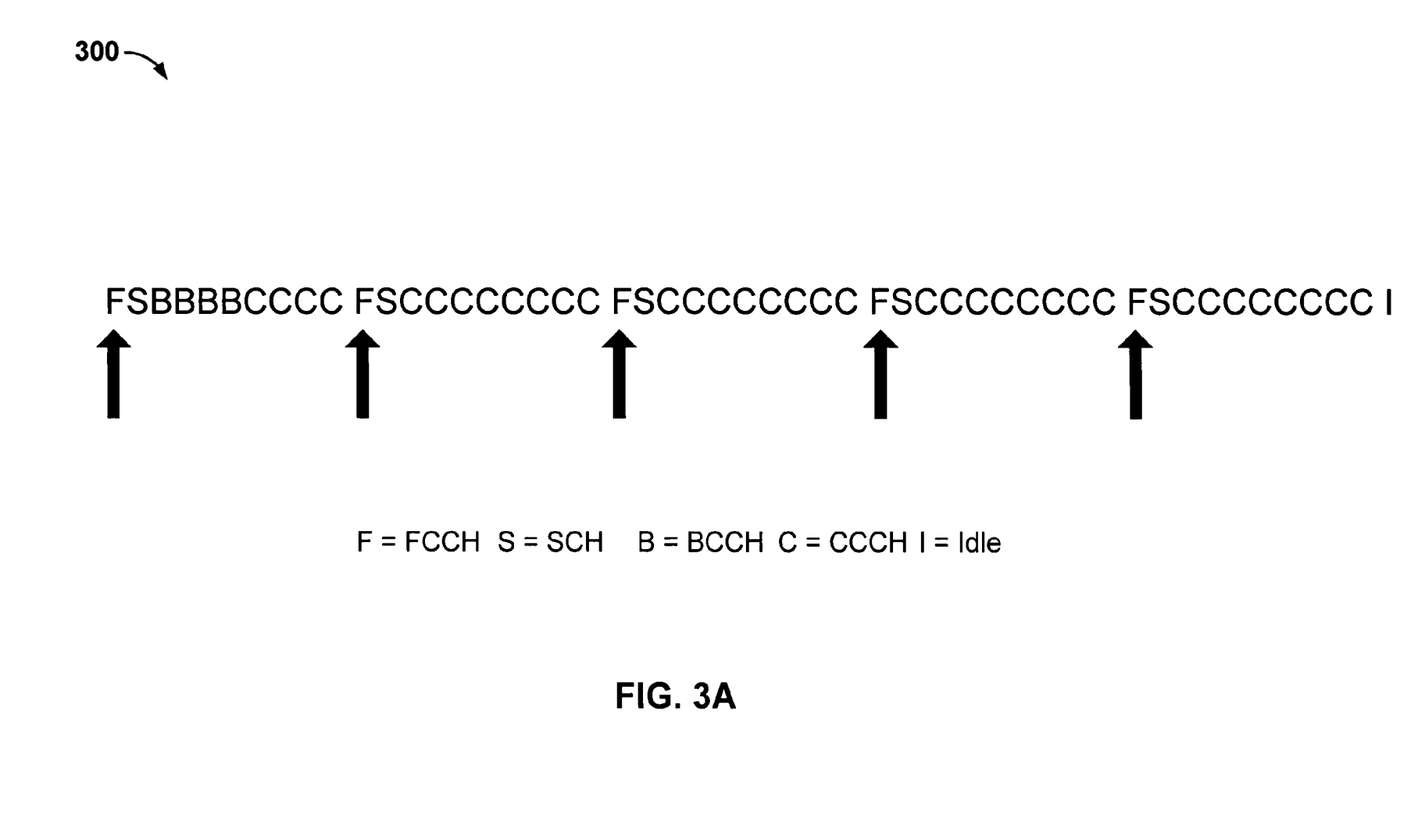
FIG. 3A illustrates an example of "Combination IV" TDMA frame mapping on TN0 for control channels (downlink; 7 other timeslots for each frame not shown).

In a GSM network, for example, in some embodiments the beacon channel bursts of interest for physical layer synchronization are the Frequency Correction CHannel (FCCH) and the Synchronization CHannel (SCH), on timeslot TN0 of the beacon frequency. FIG. 3A illustrates an example of "Combination IV" TDMA frame mapping on TN0 for control channels (downlink; 7 other timeslots for each frame not shown). As shown in FIG. 3A, a 51-frame (multiframe) 300 "signaling frame" structure is used for the beacon channel downlink. Each of the 51 boxes below actually represents a frame of eight bursts (TN0-TN7), but only the contents of the TN0 burst are shown, since that's where the FCCH and the SCH reside.

Figure 3B:
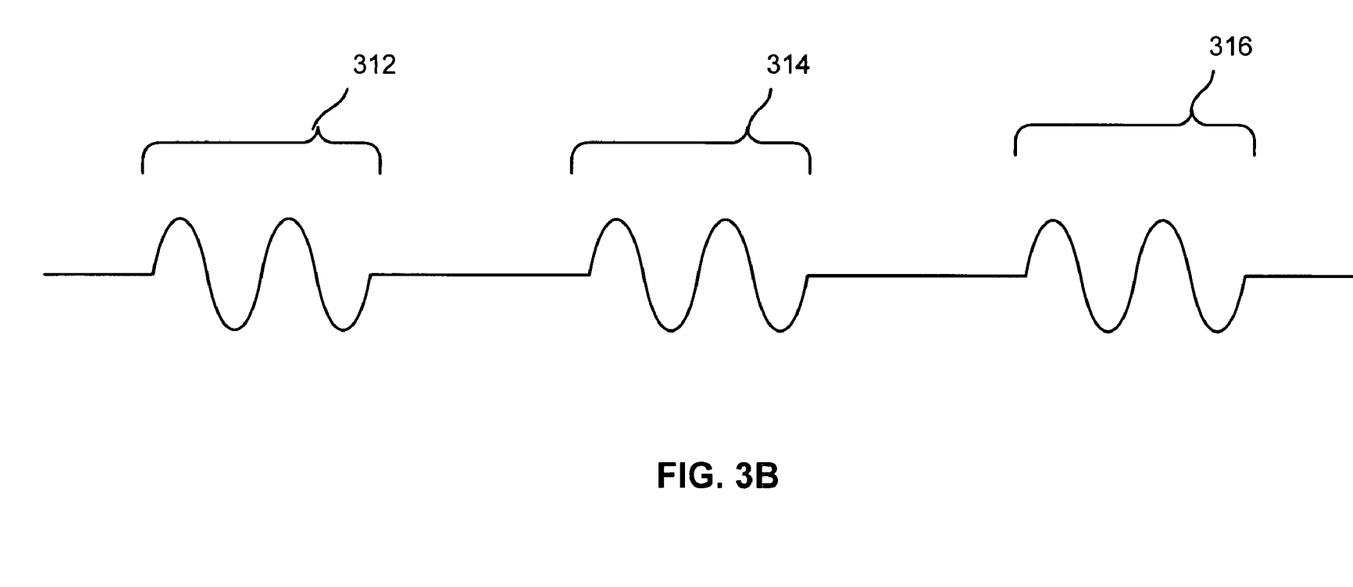
FIG. 3B illustrates FCCH bursts 312, 314, and 316 occurring periodically in a received beacon channel signal.

In a typical GSM network, the FCCH is used to provide a frequency reference to an MS, and its presence also identifies a channel as a beacon channel. It is a sine wave "burst," ~67 kHz offset from the channel center frequency. FIG. 3B illustrates FCCH bursts 312, 314, and 316 occurring periodically in a received beacon channel signal. The FCCH burst always occurs on TN0, every 10 frames within a 51-multiframe. Because the modulating bit sequence is fixed at all zeros, the result is effectively a sine wave ~67 kHz offset from the carrier center frequency, lasting 142 bits.

The sine wave nature results from a string of zeros being used for GMSK modulation bits during the burst period (effectively an unmodulated carrier). It contains no information bits. It is always followed 8 burst periods (8 BPs=1 frame) later by the SCH burst, also on TN0. The SCH burst contains a unique 64-bit extended training sequence that allows a handset to acquire burst timing synchronization, using the autocorrelation properties of the training sequence.

Thus the FCCH/SCH pattern in terms of frame numbers within the 51-multiframe structure is as follows, with five occurrences of each in each multiframe: 0/1, 10/11, 20/21, 30/31, 40/41. The 51st frame (frame 50) is idle, and then the entire sequence repeats in the next multiframe. The FCCH and SCH, therefore, each repeat every 80 timeslots within a multiframe, with a gap of 88 timeslots between multiframes.

The periodicity of the FCCH (and SCH) can be exploited for signal detection and estimation purposes in cases where the signal-to-thermal-noise ratio is low. The burst duration (or burst period BP) is known to a first degree by the RF sensor as being $15/26$ msec, or 0.577 msec. However, the burst boundaries are not known to begin with (may be off by up to half a burst period). The energy in individual gated time intervals (or time gates, consistent with a BP) can be aggregated in a manner consistent with the known periodicities of the FCCH. The time duration of the aggregation record (and thus the number of samples aggregated for each respective time gate) can be extended to cover many multiple occurrences of the FCCH. This aggregation is used in some embodiments to enhance the effective signal-to-thermal-noise ratio because the FCCH is a deterministic, static signal that can be "added up" over repeated instances, in contrast with the random nature of the thermal noise introduced by the RF sensor receiver front end. If the gated time intervals are off by half a BP (approximately worst case), then the signal energy in a transmitted burst will get split between two adjacent time gates, reducing the detected signal energy. However, the time gate boundaries in some embodiments are adjusted as the processing proceeds, making use of aggregated autocorrelation of the SCH burst's unique 64-bit extended training sequence.

Figure 4:
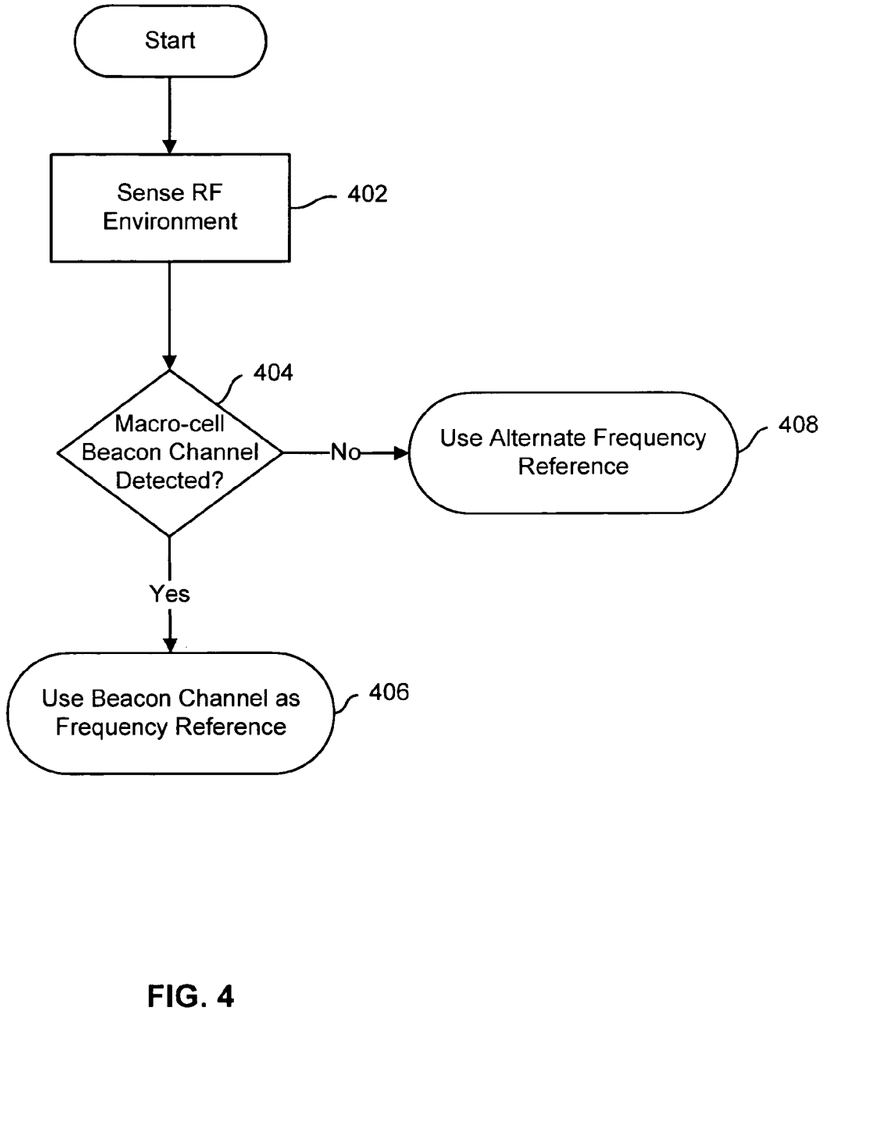
FIG. 4 is a flow chart illustrating an embodiment of a process for deriving a frequency reference from a macro-cell beacon signal.

FIG. 4 is a flow chart illustrating an embodiment of a process for deriving a frequency reference from a macro-cell beacon signal. The RF environment is sensed (402). If a macro-cell beacon signal is detected (404), the signal is used as a frequency and/or burst timing reference (406). In some embodiments, burst timing synchronization is required to enable the RF sensor and/or small scale base station to demodulate and derive from the beacon signal potentially useful information. For example, and without limitation, country code, mobile network code, base station identifier, and/or other information provided in the beacon signal is used in various embodiments to determine a location of the small scale base station and/or detect whether the small scale base station has been moved to a location in which it is not authorized to operate and/or be used. In the example shown, if no macro-cell beacon channel is detected (or if a signal is detected but is not of sufficient strength to be used to derive a frequency reference), an alternate frequency reference is used (408).

Figure 5:
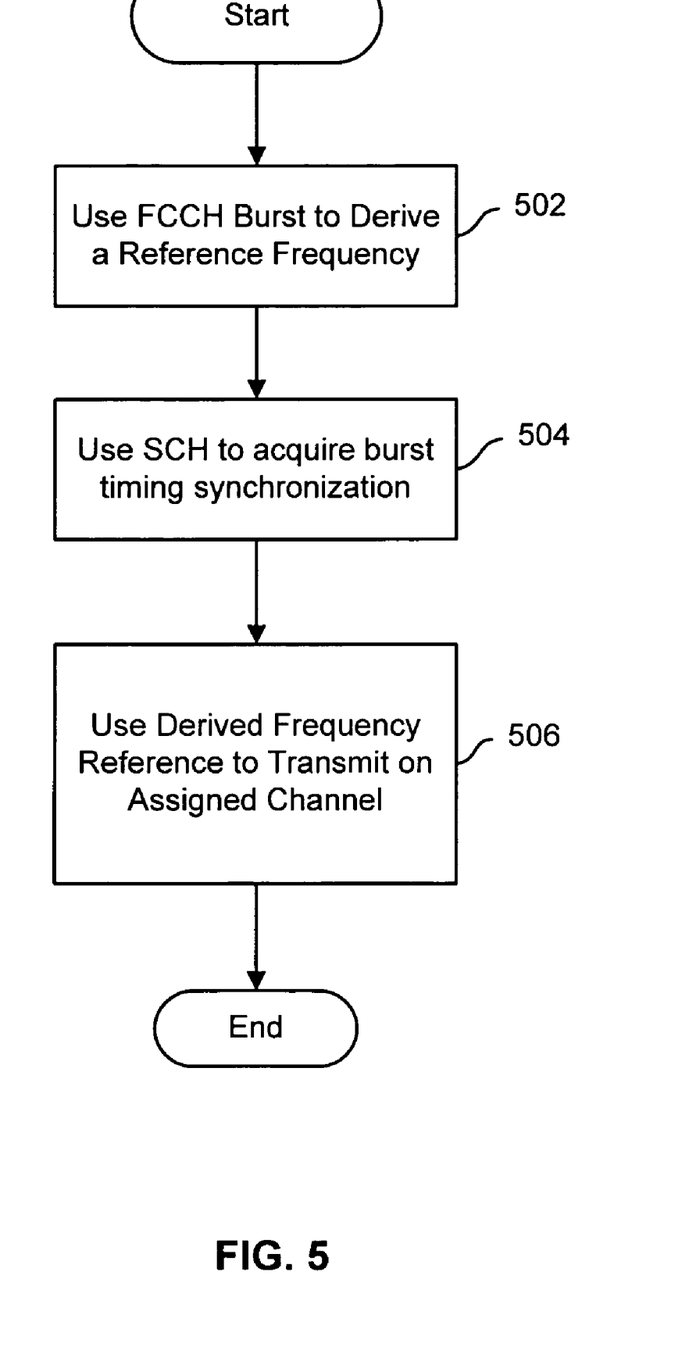
FIG. 5 is a flow chart illustrating an embodiment of a process for using a macro-cell beacon signal as a frequency and/or burst timing reference.

FIG. 5 is a flow chart illustrating an embodiment of a process for using a macro-cell beacon signal as a frequency and/or burst timing reference. In some embodiments 406 of FIG. 4 includes the process of FIG. 5. In the example shown, an FCCH (or other) burst portion of the beacon signal is used to derive a frequency reference (502). An SCH portion of the beacon signal is used to acquire burst timing synchronization (504). In some embodiments, the burst timing synchronization is used to demodulate the BCCH to extract system information and/or to enhance the frequency reference estimation process. In some embodiments, 504 is omitted and the frequency reference is derived at 502 without the benefit of SCH burst timing synchronization. The derived frequency is used, e.g., by a small scale base station by or for which the process of FIG. 5 is being performed, to transmit on an assigned channel.

The description above uses GSM as an example. UMTS uses a different scheme, but the macro-network still provides synchronization signals that an RF sensor (with different processing) could use to derive a frequency reference. The techniques described herein may be used in any mobile telecommunications network that provides synchronization signals that an RF sensor (with network-appropriate processing) could use to derive a frequency reference.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a frequency reference to a mobile telecommunications base station, comprising:
   if a macro-cell base station beacon channel is detected by a small scale base station, then wirelessly receiving, at a small scale base station from a macro-cell base station, a radio frequency signal that includes a periodic component having a known frequency;
   deriving, at the small scale base station, from the received radio signal, based at least in part on the periodic component, a frequency reference;
   using, by the small scale base station, the frequency reference to transmit from the small scale base station to a mobile station at an assigned frequency;
   and if the macro-cell base station beacon channel is not detected by the small scale base station, then using an existing IP connection of the small scale base station to receive a backup frequency reference that is used by the small scale base station to communicate with the mobile station, the existing IP connection of the small scale base station connecting to an aggregated gateway through an IP network, the aggregated gateway connecting to a base station controller through a dedicated connection, the aggregated gateway serving a plurality of small scale base stations, wherein the aggregated gateway aggregates the periodic components disposed in a same timeslot of a plurality of TDMA frames in a multiframe control channel format, and, during the aggregating, adjusting, based on another periodic component of the radio frequency signal, time gate boundaries used in the aggregating.

2. The method according to claim 1, wherein the periodic component comprises a sine wave.

3. The method according to claim 1, wherein the periodic component comprises a sine wave burst.

4. The method according to claim 1, wherein the periodic component comprises a frequency correction channel (FCCH) component of a beacon signal transmitted by a macro-cellular base station.

5. The method according to claim 1, wherein the periodic component is included in the received signal at least in part to provide a frequency reference to mobile stations configured to access a core mobile network via a base station that transmitted the received signal.

6. The method according to claim 1, wherein the periodic component comprises an unmodulated carrier.

7. The method according to claim 1, wherein the periodic component comprises a carrier modulated by a series of equal data values.

8. The method according to claim 1, wherein using the frequency reference to transmit at an assigned frequency comprises transmitting from a base station at the assigned frequency with a required degree of accuracy.

9. The method according to claim 1, wherein the periodic component comprises a signal burst and further comprising using a second component of the received signal to acquire burst timing synchronization.

10. The method according to claim 9, further comprising aggregating energy from successive received bursts to enhance the effective signal-to-thermal-noise ratio.

11. The method according to claim 9, further comprising using the burst timing synchronization to demodulate and derive information from the received signal.

12. The method according to claim 1, wherein the assigned frequency comprises a beacon frequency.

13. The method according to claim 1, wherein the aggregated gateway is configured to interface with IP network when communicating with the plurality of small scale base stations, and wherein the aggregated gateway is configured to interface with the dedicated line when communicating with the base station controller.

14. The method according to claim 1, wherein the small scale base station is connected to the IP network independent of whether the small scale base station detects the macro-cell base station beacon channel, and wherein the small scale base station, the macro-cell base station, the aggregated gateway and the base station controller are part of a mobile communications network.

15. A small scale telecommunications base station, comprising:
   a radio frequency receiver front end configured to wirelessly receive a radio frequency signal from a macro-cell telecommunications base station, the radio frequency signal comprising a periodic component having a known frequency; and
   a processor coupled to the receiver front end, wherein the processor is configured to derive from the received radio signal, based at least in part on the periodic component, a frequency reference to be used by the small scale telecommunications base station to transmit at an assigned frequency to a mobile handset if the small scale telecommunications base station detects a macro-cell telecommunications base station beacon channel,
   wherein the small scale telecommunications base station is configured to use an existing IP connection of the small scale telecommunications base station to receive a backup frequency reference that is used by the small scale telecommunications base station to communicate with the mobile station if the small scale telecommunications base station does not detect the macro-cell telecommunications base station beacon channel, the existing IP connection of the small scale base station connecting to an aggregated gateway through an IP network, the aggregated gateway connecting to a base station controller through a dedicated connection, the aggregated gateway serving a plurality of small scale base stations, wherein the periodic components are aggregated over a same timeslot of a plurality of TDMA frames of a control channel multiframe format, and wherein the periodic components are aggregated using time gate boundaries that are adjusted during the aggregation over the same time slot of the plurality of TDMA frames of the control channel multiframe format, and wherein the time gate boundaries are adjusted based on a different periodic component of the radio frequency signal disposed in a different timeslot of the plurality of TDMA frames of the control channel multiframe format.

16. The small scale telecommunications base station according to claim 15, wherein the periodic component comprises a signal burst and further comprising using a second component of the received signal to acquire burst timing synchronization.

17. The small scale telecommunications base station according to claim 15, wherein the aggregated gateway is configured to interface with IP network when communicating with the plurality of small scale telecommunications base stations, and wherein the aggregated gateway is configured to interface with the dedicated line when communicating with the base station controller.

18. The small scale telecommunications base station according to claim 15, wherein the small scale telecommunications base station is connected to the IP network independent of whether the small scale base station detects the macro-cell base station beacon channel, and wherein the small scale telecommunications base station, the macro-cell telecommunications base station, the aggregated gateway and the base station controller are part of a mobile communications network.

* * * * *